(12) United States Patent
Amidi et al.

(10) Patent No.: US 10,076,011 B1
(45) Date of Patent: Sep. 11, 2018

(54) COLOR ADJUSTMENT BASED ON DALI DIM LEVEL COMMAND

(71) Applicant: Cooper Technologies Company, Houston, TX (US)

(72) Inventors: Soroush Amidi, Oakville (CA); Kyle Joseph Van Bavel, Oakville (CA)

(73) Assignee: Cooper Technologies Company, Houston, TX (US)

(*) Notice: Subject to any disclaimer, the term of this patent is extended or adjusted under 35 U.S.C. 154(b) by 0 days.

(21) Appl. No.: 15/630,793

(22) Filed: Jun. 22, 2017

Related U.S. Application Data

(60) Provisional application No. 62/353,843, filed on Jun. 23, 2016.

(51) Int. Cl.
| | | |
|---|---|---|
| G05F 1/00 | (2006.01) |
| H05B 37/02 | (2006.01) |
| H05B 39/04 | (2006.01) |
| H05B 41/36 | (2006.01) |
| H05B 33/08 | (2006.01) |

(52) U.S. Cl.
CPC ......... H05B 33/0857 (2013.01); H05B 37/02 (2013.01)

(58) Field of Classification Search
None
See application file for complete search history.

(56) References Cited

U.S. PATENT DOCUMENTS

| | | | | |
|---|---|---|---|---|
| 2013/0063035 | A1* | 3/2013 | Baddela | H05B 33/086 315/192 |
| 2014/0084802 | A1* | 3/2014 | Gruber | H05B 33/0824 315/201 |
| 2015/0145436 | A1* | 5/2015 | Hasegawa | H05B 33/0815 315/294 |
| 2016/0157319 | A1* | 6/2016 | Yadav | H05B 33/0869 315/151 |
| 2016/0242256 | A1* | 8/2016 | Kim | H05B 37/0272 |

* cited by examiner

*Primary Examiner* — Anh Tran
(74) *Attorney, Agent, or Firm* — King & Spalding LLP (57) ABSTRACT

A method of adjusting a correlated color temperature (CCT) of a light provided by a lighting fixture includes receiving, by a DALI command converter device, a DALI dim level command indicating a dim level for the light provided by the lighting fixture. The method further includes providing a first output signal to adjust a dim level of a first light emitted by a first light emitting diode (LED) light source to a first dim level. The method also includes providing a second output signal to adjust a dim level of a second light emitted by a second LED light source to a second dim level that is different from the first dim level. The light provided by the lighting fixture is a combination of the first light and the second light. The DALI command converter device generates the first output signal and the second output signal based on the DALI dim level command.

17 Claims, 5 Drawing Sheets

COLOR ADJUSTMENT BASED ON DALI DIM LEVEL COMMAND

CROSS REFERENCE TO RELATED APPLICATIONS

The present application claims priority under 35 U.S.C. Section 119(e) to U.S. Provisional Patent Application No. 62/353,843, filed Jun. 23, 2016 and titled "Color Adjustment Based On DALI Dim Level Command," the entire content of which is incorporated herein by reference.

TECHNICAL FIELD

The present disclosure relates generally to lighting solutions, and more particularly to color temperature adjustment of a light emitted by a light fixture based on Digital Addressable Lighting Interface (DALI) dim level commands.

BACKGROUND

A DALI lighting system typically includes a DALI controller device and a number of DALI compatible lighting fixtures and other devices. In a DALI lighting system, the DALI controller may control a number of DALI light fixtures using DALI commands. For example, a DALI controller can send DALI commands to turn on and off as well as to change a dim level of light emitted by one or more light fixtures.

In some applications, it may be desirable to change the correlated color temperature (CCT) of a light emitted by a light fixture. However, many existing DALI lighting systems do not support explicit color temperature adjustment commands. For example, some DALI controllers do not send out color temperature control commands, and some DALI-compatible lighting fixtures may not support color temperature control commands. Further, DALI lighting systems that support color temperature control commands generally rely on separate DALI commands resulting in additional network traffic. Thus, a solution that uses existing DALI commands for color temperature setting/adjustment of light emitted by a lighting fixture of a DALI lighting system is desirable.

SUMMARY

The present disclosure relates generally to lighting solutions, and more particularly to color temperature adjustment of a light emitted by a light fixture based on DALI dim level commands. In an example embodiment, a method of adjusting a correlated color temperature (CCT) of a light provided by a lighting fixture includes receiving, by a DALI command converter device, a DALI dim level command indicating a dim level for the light provided by the lighting fixture. The method further includes providing a first output signal to adjust a dim level of a first light emitted by a first light source to a first dim level. The method also includes providing a second output signal to adjust a dim level of a second light emitted by a second light source to a second dim level that is different from the first dim level. The light provided by the lighting fixture is a combination of the first light and the second light. The DALI command converter device generates the first output signal and the second output signal based on the DALI dim level command.

In another example embodiment, a DALI command converter device includes a memory device to store first dimming curve data and second dimming curve data, where the first dimming curve data corresponds to a first dimming curve and where the second dimming curve data corresponds to a second dimming curve that is different from the first dimming curve. The DALI command converter device further includes a controller to receive a DALI dim level command indicating a dim level and to generate a first output signal based on the DALI dim level command and based on the first dimming curve data stored in the memory device and to generate a second output signal based on the DALI dim level command and based on the second dimming curve data stored in the memory device. The first output signal and the second output signal are dim level control signals that result in a desired correlated color temperature (CCT) of a light provided by a lighting fixture.

In another example embodiment, a lighting fixture includes a first light emitting diode (LED) light source to emit a first light, and a second LED light source to emit a second light. The first light and the second light combine to produce a combined light provided by the lighting fixture. The lighting fixture further includes an LED driver that provides power to the first LED light source and to the second LED light source. The lighting fixture also includes a DALI command converter device coupled to the LED driver. The DALI command converter device includes a memory device to store first dimming curve data and second dimming curve data corresponding to different dimming curves. The DALI command converter device further includes a controller that receives a DALI dim level command indicating a dim level, generates a first output signal based on the DALI dim level command and based on the first dimming curve data stored in the memory device, and generates a second output signal based on the DALI dim level command and based on the second dimming curve data stored in the memory device. The first output signal and the second output signal are dim level control signals provided to the LED driver and that result in a desired correlated color temperature (CCT) of the combined light.

These and other aspects, objects, features, and embodiments will be apparent from the following description and the claims.

BRIEF DESCRIPTION OF THE FIGURES

Reference will now be made to the accompanying drawings, which are not necessarily drawn to scale, and wherein.

The drawings illustrate only example embodiments and are therefore not to be considered limiting in scope. The elements and features shown in the drawings are not necessarily to scale, emphasis instead being placed upon clearly illustrating the principles of the example embodiments. Additionally, certain dimensions or placements may be exaggerated to help visually convey such principles. In the drawings, reference numerals that are used with respect to different drawings designate like or corresponding, but not necessarily identical elements.

DETAILED DESCRIPTION OF THE EXAMPLE EMBODIMENTS

In the following paragraphs, example embodiments will be described in further detail with reference to the figures. In the description, well known components, methods, and/or processing techniques are omitted or briefly described. Furthermore, reference to various feature(s) of the embodiments is not to suggest that all embodiments must include the referenced feature(s).

In some example embodiments, an LED driver may be used in a DALI lighting system to control color temperature of a light emitted by a lighting fixture. For example, the LED driver may enable a DALI lighting system to support color temperature control of a light emitted by a lighting fixture. The LED driver may also enable a DALI lighting system to control color temperature of a light without resorting to the use of the dedicated color temperature control DALI commands. For example, a lighting fixture in a DALI lighting system may include two or more LED light sources that emit lights that produce the combined light provided by the lighting fixture. The LED driver may be used for color temperature control of the light provided by such a light fixture based on two or more individual dimming curves that are associated with two or more LED output channels of the driver. To illustrate, two or more LED light sources of the lighting fixture may be coupled to corresponding two or more output channels of an LED driver, and the two or more dimming curves stored in the LED driver may be used to set light intensity/dim levels of the lights emitted by the two or more LED light sources.

For each dim/intensity level indicated by a DALI command with respect to a light fixture that has multiple light sources, each light of the multiple lights emitted by the multiple light sources has a dim/intensity level determined based on a corresponding dimming curve such that the combination of the multiple lights has a desired color temperature as well as dim/intensity level. Each dimming curve associated with an output channel of the LED driver is used to generate an output power signal on the corresponding LED output channel based on dim/intensity levels indicated in DALI commands received by the LED driver. The dimming curves associated with LED output channels of the LED driver may be stored in the LED driver via a programming interface of the LED driver during manufacturing or at light fixture assembly.

In some alternative embodiments, two or more dimming curves may be stored in a DALI command converter device, instead of in an LED driver, to generate two or more dim control signals (e.g., two or more 0-to-10 volt dim control signals) that are provided to two or more LED drivers that provide corresponding power to two or more light sources of a lighting fixture. The two or more dim control signals (e.g., two or more 0-to-10 volt dim control signals) from a DALI command converter device may alternatively be provided to a multichannel driver with multiple output channels that provide corresponding power to two or more light sources of a lighting fixture. The dimming curves associated with LED output channels of the LED driver may be stored in the DALI command converter device via a programming interface of the converter device during manufacturing or at light fixture assembly. Alternatively or in addition, the dimming curves may be set via the DALI interface of the LED driver or the converter device, for example, allowing the dimming curves to be updated in field installations.

Figure 1:
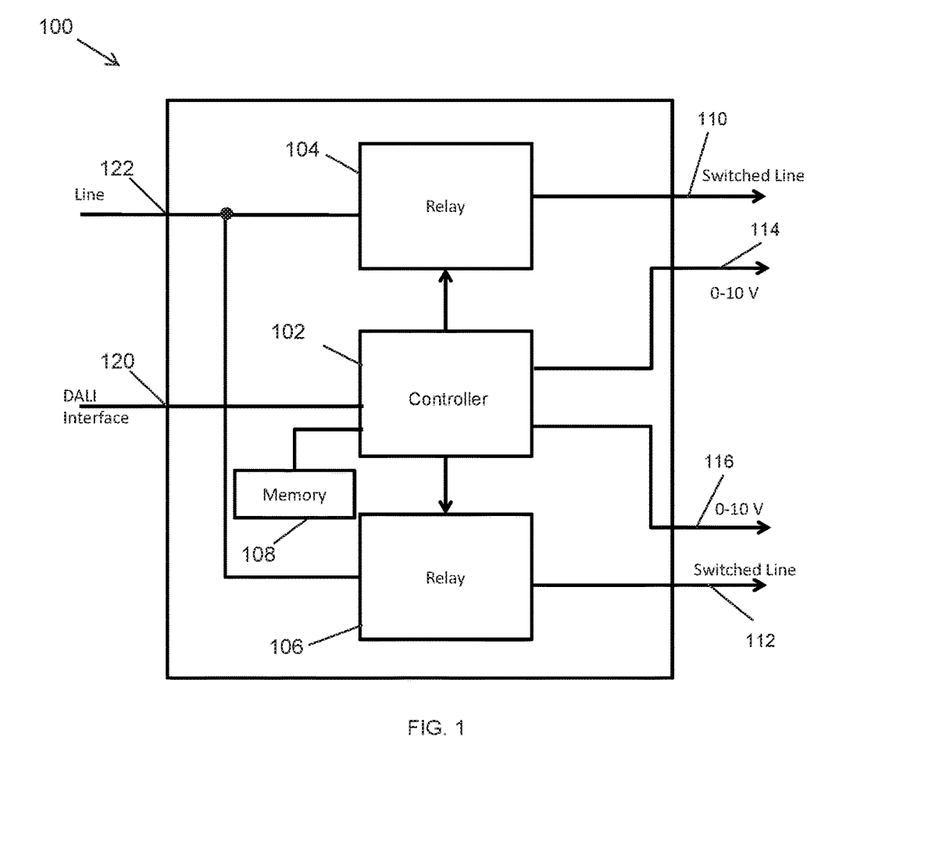
FIG. 1 illustrates a DALI command converter device for controlling color temperature of a light based on DALI dim level commands according to an example embodiment.

Turning now to the figures, particular example embodiments are described. FIG. 1 illustrates a DALI command converter device 100 for controlling color temperature of a light based on DALI dim level commands according to an example embodiment. For example, the device 100 may be coupled to an LED driver to control the power that the LED driver provides to each one of two LED light sources of a light fixture. Because the light from the lighting fixture is a combination of the lights from the two LED light sources, the dim level and the color temperature of the light from the lighting fixture may be adjusted by adjusting the dim level of the light emitted by each of the two LED light sources. The dim level of each light depends on the amount of power provided to each light source.

In some example embodiments, the device 100 includes a controller 102, a first relay 104, a second relay 106, and a memory device 108 (e.g., an EEPROM). The controller 102 is coupled to the relays 104, 106 and to the memory device 108. The device 100 may also include a DALI interface 120 and a line power input 122. The device 100 may communicate with a DALI controller via the DALI interface 120.

As illustrated in FIG. 1, the line power input 122 may be coupled to the relays 104, 106. For example, line power such as AC power from a mains supply may be provided to the relays 104, 106 via the line power input 122. The relay 104 may output a first switched power via a switched line output 110 of the device 100. The relay 106 may output a second switched power via a switched line output 112 of the device 100. The controller 102 may turn on and off the relays 104, 106. For example, the controller 102 may include a microcontroller that is used to control the relays 104, 106 and to perform other operations as can be understood by those of ordinary skill in the art with the benefit of this disclosure.

For example, the controller 102 may include a microcontroller that executes software code stored in the memory device 108 or in another memory device to perform various operations. To illustrate, the controller 102 may receive a DALI command via the DALI interface 120 and may generate one or more signals to turn on and off the relays 104, 106 in response to the DALI command. For example, the device 100 may receive a DALI power off command or a DALI dim level command from a DALI controller device and may turn off the relay 104, the relay 106, or both in response to the command.

In some example embodiments, the memory device 108 contains or may be programmed to store two or more sets of dimming curve data corresponding to respective two or more dimming curves. For example, the two or more diming curves may be different from each other such that, for a particular dim level indicated by a DALI dim level command, a light that is emitted based on one of the dimming curves can have a dim/intensity level that is different from another light that is emitted based on another one of the dimming curves. The memory device 108 may be programmed to store dimming curve data via a programming interface (not shown) during manufacturing or assembly or via the DALI interface 120.

In some example embodiments, the controller 102 generates 0-to-10 volt dim control output signals provided on a 0-to-10 volt output 114 and to a 0-to-10 volt output 116 of the device 100. For example, the controller 102 may generate a first 0-to-10 volt dim control output signal on the output 114 based on a DALI dim level command received by the controller 102 and based on a first dimming curve data stored in the memory device 108. The controller 102 may also generate a second 0-to-10 volt dim control output signal on the output 116 based on the same DALI dim level command received by the controller 102 and based on a second dimming curve data stored in the memory device 108. To illustrate, for a particular dim/intensity level indicated by a DALI dim level command received by the controller 102, the first 0-to-10 volt dim control output signal on the output 114 may result in a light that has a dim/intensity level that is different from a dim/intensity level of a light emitted based on the second 0-to-10 volt dim control output signal on the output 116.

In some example embodiments, the controller 102 may turn off the relay 104 based on a DALI dim level command. For example, the controller 102 may turn off the first switched power on the switched line output 110 based on a DALI dim level command received by the controller 102 and based on the first dimming curve data stored in the memory device 108 and may generate the second 0-to-10 volt dim control output signal on the output 116 based on the same DALI dim level command and based on the second dimming curve data stored in the memory device 108. In some alternative embodiments, the controller 102 may turn off the relay 106 instead of the relay 104 based on a DALI dim level command.

In some example embodiments, the first and second dimming curve data used by the controller 102 may be replaced with other sets of dimming curve data that correspond to different dimming curves. For example, other sets of dimming curve data may be stored in the memory device 108 and may be used instead of currently used sets of dimming curve data to generate the 0-to-10 volt dim control signals on the outputs 114, 116. For example, the DALI interface 120 may be used to change the sets of dimming curve data to be used by the controller 102 to generate the 0-to-10 volt dim control output signals.

By controlling the switched power on the outputs 110, 112 based on DALI dim level commands and by controlling dim control signals on the outputs 114, 116 based on the DALI dim level commands and different dimming curves, the device 100 enables color temperature adjustment of a light that is a combination of lights emitted by different LED light sources of a lighting fixture. For example, one dimming curve may be a linear curve, and another dimming curve may be an S-curve. The device 100 enables DALI control of a warm dimming 0-10V lighting fixture to adjust the color temperature of the light from the light fixture along with the dim/intensity level of the light provided by the fixture. To illustrate, a warm dimming fixture that includes a warm LED light source and a cool LED light source that are coupled to two 0-10V LED drivers (i.e., one driver for the cool LED light source and one for the warm LED light source) may include or may be coupled to the device 100 such that the intensity/dim levels of lights emitted by the warm LED light source and the cool LED light source can be controlled individually by the device 100 to produce a dim level indicated by a DALI dim level command and a desired color temperature.

Although two relays are shown in FIG. 1, in some alternative embodiments, the device 100 may include one relay or more than two relays without departing from the scope of this disclosure. In some alternative embodiments, the controller 102 may generate more than two 0-to-10 volt dim control signals based on more than two sets of dimming curve data stored in the memory device 108. In some alternative embodiments, the controller 102 may generate dim control signals other than 0-to-10 volt dim control signals without departing from the scope of this disclosure.

Figure 2:
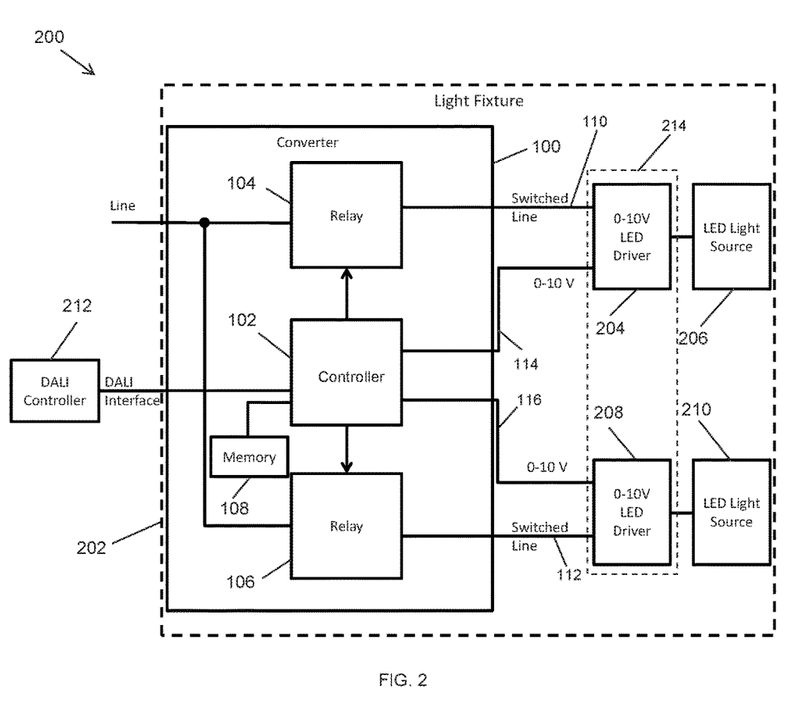
FIG. 2 illustrates a DALI lighting system including a light fixture that includes the DALI command converter device of FIG. 1 according to an example embodiment.

FIG. 2 illustrates a DALI lighting system 200 including a light fixture 202 that includes the DALI command converter device 100 of FIG. 1 according to an example embodiment. Referring to FIGS. 1 and 2, in some example embodiments, the lighting system 200 includes a lighting fixture 202 and a DALI controller 212, and the lighting fixture 202 includes the DALI command converter device 100, LED drivers 204, 208 (e.g., 0-to-10 volt LED drivers), and LED light sources 206, 210. The LED driver 204 is coupled to the LED light source 206 and provides power to the LED light source 206. The LED driver 208 is coupled to the LED light source 210 and provides power to the LED light source 210.

In some example embodiments, the LED light sources 206, 210 may each include one or more discrete light-emitting diodes (LEDs), one or more organic light-emitting diodes (OLEDs), an LED chip on board that includes one or more discrete LEDs, or an array of discrete LEDs. As a non-limiting example, the LED light source 206 may emit a warm light (e.g., 2700K or 3000K), and the LED light source 210 may emit a cool light (e.g., 5000K).

In some example embodiments, the DALI command converter device 100 operates in the same manner described above with respect to FIG. 1 to provide switched power to the LED drivers 204, 208 via outputs 110, 112, respectively. The device 100 may also operate in the manner described above to provide 0-to-10 volt dim control output signals to the 0-to-10 volt LED drivers 204, 208 via the 0-to-10 volt outputs 114, 116, respectively.

The DALI controller 212 is coupled to the lighting fixture 202 to provide DALI commands to the lighting fixture 202. For example, the device 100 may receive a DALI dim level command that indicates a dim/intensity level that the light emitted by the lighting fixture 202 should have. Because the light provided by the lighting fixture 202 is a combination of a light emitted by the first LED light source 206 and a light emitted by the second LED light source 210, the dim/intensity level and color temperature of the light provided by the lighting fixture 202 may be adjusted by changing the dim/intensity levels of the lights emitted by the LED light sources 206, 210.

To illustrate, the dim/intensity level of the light emitted by the first LED light source 206 may be adjusted to have a first dim level, and the dim/intensity level of the light emitted by the second LED light source 210 may be adjusted to have a second dim level that is the same or different from the first dim level. For example, the dim/intensity level of the light emitted by the first LED light source 206 may be adjusted by the LED driver 204 based on the 0-to-10 volt dim control output signal provided by the device 100 via the 0-to-10 volt output 114. The dim/intensity level of the light emitted by the second LED light source 210 may be adjusted by the LED driver 208 based on the 0-to-10 volt dim control output signal provided by the device 100 via the 0-to-10 volt output 116. For example, the LED driver 204 may adjust the power provided to the first LED light source 206 based on the 0-to-10 volt dim control output signal received via the 0-to-10 volt output 114, and the LED driver 208 may adjust the power provided to the second LED light source 210 based on the 0-to-10 volt dim control output signal received via the 0-to-10 volt output 116.

As described above, the 0-to-10 volt dim control output signal provided to the LED driver 204 may be generated based on a DALI dim level command and based on a first dimming curve, and the 0-to-10 volt dim control output signal provided to the LED driver 208 may be generated based on the same DALI dim level command and based on a different dimming curve. The dimming curves may be selected such that the light emitted by the first LED light source 206 and the light emitted by the second LED light source 210 are combined to produce a light that has the dim level corresponding to the dim level indicated by the DALI dim level command and that has a desired color temperature for the particular dim level. In some example embodiments, the DALI command converter device 100 generates the 0-to-10 volt dim control output signal provided to the LED driver 204 and the 0-to-10 volt dim control output signal provided to the LED driver 208 based on a mapping of a dim level indicated by a DALI dim level command and a desired CCT of the light provided by the lighting fixture 202. For example, the information used in mapping dim levels indicated by DALI dim level commands to CCT values of the light may be stored in the memory device 108 or in another memory device.

In some example embodiments, the device 100 may turn off the power provided to one of the LED drivers 204, 206 based on the DALI dim level command and the dimming curve data stored in the memory device 108. The device 100 may also turn off power provided to both of the LED drivers 204, 206 based on the DALI dim level command and the dimming curve data stored in the memory device 108, where the dimming curve data corresponds to two different dimming curves.

In some example embodiments, the LED drivers 204, 206 may be replaced by a single multichannel 0-to-10 volt LED driver without departing from the scope of this disclosure. In some alternative embodiments, the LED drivers 204, 206 may be drivers other than 0-to-10 volt drivers without departing from the scope of this disclosure. In some example embodiments, the device 100 and the LED drivers 204, 206 may be integrated into a single device such as a single LED driver 214 with multiple output channels. In some alternative embodiments, the lighting fixture 202 may include more than two drivers and light sources without departing from the scope of this disclosure.

In some example embodiments, the dimming curves may be selected such that a light provided by a light fixture has a desired color temperature-to-dim level relationship. By allowing use of a DALI dim level command and dimming curves to adjust the dim level as well as the color temperature of a light provided by a light fixture, standard DALI dim level (i.e., intensity level) commands may be used to achieve desired dim/intensity level and color temperature.

Figure 3:
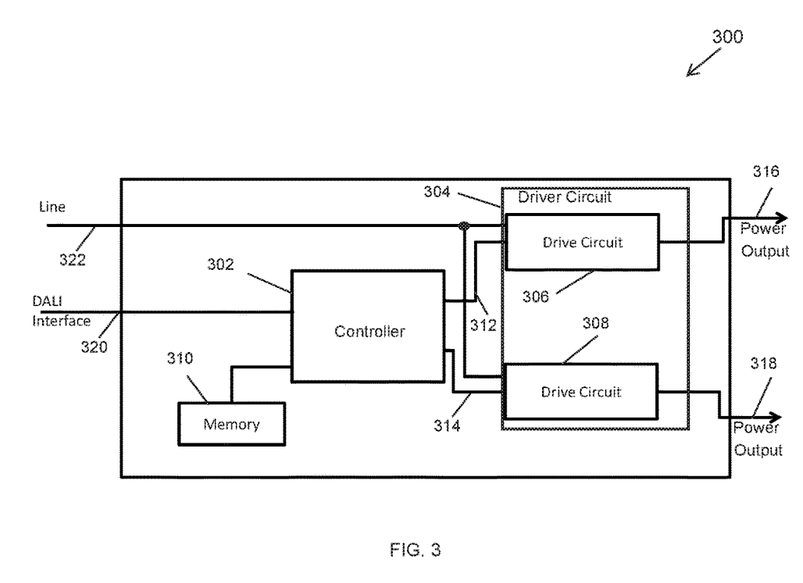
FIG. 3 illustrates an LED driver that adjusts color temperature of a light based on DALI dim level commands according to an example embodiment.

FIG. 3 illustrates an LED driver 300 that adjusts color temperature of a light based on DALI dim level commands according to an example embodiment. In some example embodiments, the LED driver 300 includes a controller 302, a driver circuit 304, and a memory device 310 (e.g., an EEPROM). The driver circuit 304 may include drive circuits 306, 308 that generate power output signals used to provide power to LED light sources via power outputs 316, 318 of the LED driver 300. The LED driver 300 may receive DALI commands including DALI dim level commands via a DALI interface 320. The LED driver 300 may include a line power input 122 to receive line power from a power supply such as a mains power supply.

The memory device 310 may be used in a similar manner as described with respect the memory device 108 to FIGS. 1 and 2. For example, the memory device 310 may contain or may be programmed to store sets of dimming curve data that correspond to dimming curves that are different from each other. To illustrate, a first set of dimming curve data stored in the memory device 310 may correspond to a first dimming curve, and a second set of dimming curve data stored in the memory device 310 may correspond to a second dimming curve that is different from the first dimming curve. Dimming curve data may be stored in the memory device 310 in the same manner described with respect to the memory device 108.

In some example embodiments, the controller 302 may operate in a similar manner as described with respect to the controller 102 of FIGS. 1 and 2 to generate dim level control signals based on a DALI dim level command and different sets of dimming curve data stored in the memory device 310. For example, the controller 302 may generate and provide a first dim control signal to the drive circuit 306 via a connection 312, and the controller 302 may generate and provide a second dim control signal to the drive circuit 308 via a connection 314. The controller 302 may generate the first dim control signal provided to the drive circuit 306 based on a DALI dim level command and the first set of dimming curve data stored in the memory device 310. The controller 302 may generate the second dim control signal provided to the drive circuit 308 based on the same DALI dim level command and the second set of dimming curve data stored in the memory device 310. The dimming curves may be selected such that a light provided by a light fixture has a desired color temperature-to-dim level relationship. For example, one dimming curve may be a linear curve, and another dimming curve may be an S-curve. The controller 302 may execute software code stored in the memory device 108 (or in another memory device) to perform some of the operations such as processing received DALI dim level commands and generating outputs provided to the drive circuit 306, 308 based on the stored dimming curves.

In some example embodiments, the dimming curve data used by the controller 102 to generate the first dim control signal on the connection 312 and the second dim control signal on the connection 314 may be replaced with other sets of dimming curve data that correspond to different dimming curves. For example, other sets of dimming curve data may be stored in the memory device 108 and may be used instead of currently used sets of dimming curve data to generate the dim control signals provided to the driver circuits 306, 308. For example, the DALI interface 320 may be used to change the sets of dimming curve data used by the controller 302.

In some example embodiments, the drive circuits 306, 308 generate power output signals that are used to provide power via power outputs 316, 318 of the LED driver 300. The drive circuit 306 generates a first power output signal on the power output 316 based on the first dim control signal provided to the drive circuit 306 via the connection 312. The drive circuit 308 generates a second power output signal on the power output 318 based on the second dim control signal provided to the drive circuit 308 via the connection 314.

By using a DALI dim level command and different dimming curves to adjust the dim level as well as the color temperature of a light provided by a light fixture, standard DALI dim level (i.e., intensity level) commands may be used to achieve desired dim/intensity level and color temperature. By using dim level commands to adjust the color temperature of the light provided by a lighting fixture, the LED driver 300 enables color temperature adjustment in a DALI system that does not support explicit DALI color temperature adjustment commands. In DALI systems that support explicit DALI color temperature adjustment commands, the LED driver 300 can avoid the use of such commands by instead using DALI dim level commands as described above.

Although two driver circuits are shown in FIG. 3, in alternative embodiments, the LED driver 300 may include more than two drive circuits. In some example embodiments, the memory device 308 may include more than two sets of dimming curve data corresponding to more than two dimming curves to support more than two drive circuits.

Figure 4:
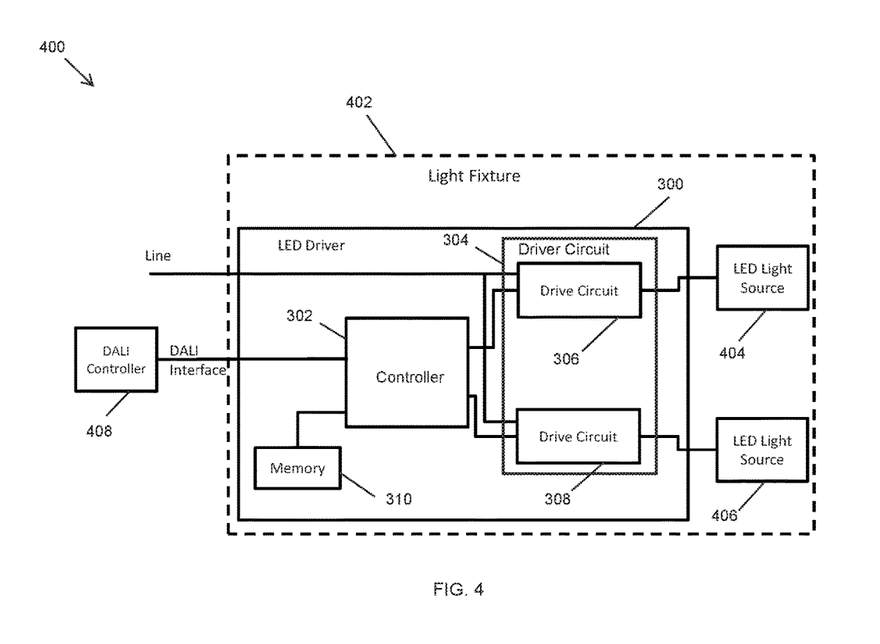
FIG. 4 illustrates a DALI lighting system including a light fixture that includes the LED driver of FIG. 3 according to an example embodiment.

FIG. 4 illustrates a DALI lighting system 400 including a lighting fixture 402 that includes the LED driver 300 of FIG. 3 according to an example embodiment. Referring to FIGS. 3 and 4, the lighting system 400 includes the lighting fixture 402 and a DALI controller 408. For example, the DALI controller 408 may correspond to the DALI controller 212 of FIG. 2. The lighting fixture 402 includes the LED driver 300 that is coupled to a first LED light source 404 and a second LED light source 406. For example, the LED light sources 404, 406 may correspond to the LED light sources 206, 210, respectively, of FIG. 2.

In some example embodiments, the light provided by the lighting fixture 402 is a combination of the lights emitted by the LED light sources 404, 406 such that the dim/intensity level and color temperature of the light provided by the lighting fixture 402 may be adjusted by adjusting the dim/intensity level of one or both of the lights emitted by the LED light sources 404, 406. For example, the dim/intensity levels of the lights emitted by the LED light sources 404, 406 may be adjusted by controlling the power provided by the drive circuits 306, 308 to the LED light sources 404, 406. As described above, the power provided by the drive circuits 306, 308 may be adjusted based on the dim level control signals provided to the drive circuits 306, 308 by the controller 302. The dim level control signals provided to the drive circuits 306, 308 are generated by the controller based on DALI dim level command(s) and dimming curve data stored in the memory device. For example, the controller 302 may include a microcontroller that performs functions of the controller 302.

In some example embodiments, the driver 300 generates the dim control signals provided to the driver circuit 306, 308 based on a mapping of a dim level indicated by a DALI dim level command and a desired CCT of the light provided by the lighting fixture 402. The dimming curves used by the controller 302 may be selected such that a light provided by the light fixture 402 has a desired color temperature-to-dim level relationship. By allowing use of a DALI dim level command and dimming curves to adjust the dim level as well as the color temperature of a light provided by a light fixture, standard DALI dim level/intensity level commands may be used to achieve desired dim/intensity level and color temperature.

In some alternative embodiments, the lighting fixture 402 may include more than two light sources and multiple ones of the LED driver 300 or an embodiment of the LED driver 300 that has more than two driver circuits without departing from the scope of this disclosure.

Figure 5:
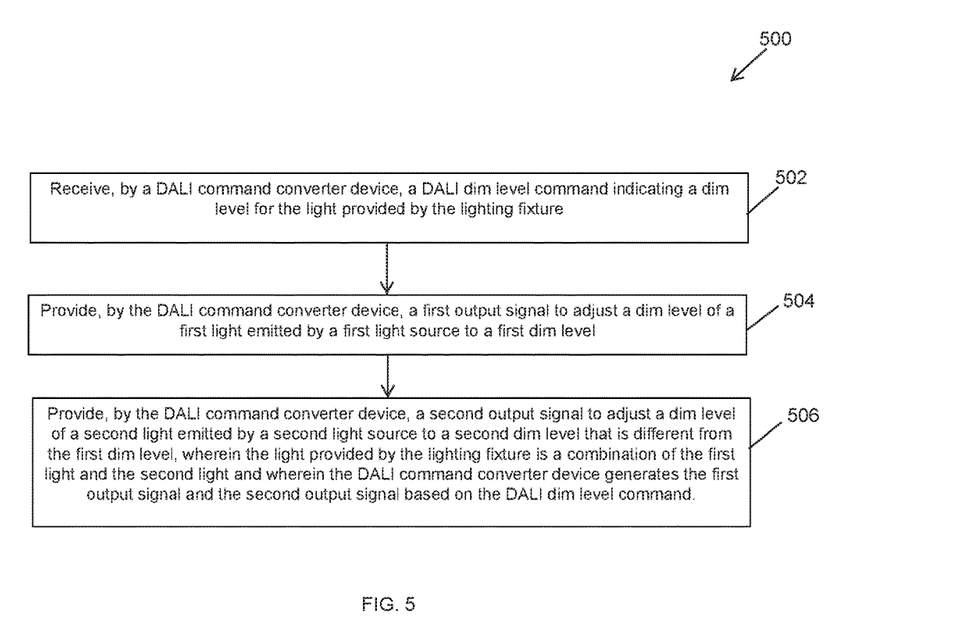
FIG. 5 illustrates a method of adjusting color temperature of a light based on DALI dim level commands according to an example embodiment.

FIG. 5 illustrates a method 500 of adjusting color temperature of a light based on DALI dim level commands according to an example embodiment. Referring to FIGS. 1-5, at step 502, the method includes receiving, by a DALI command converter device, a DALI dim level command indicating a dim level for the light provided by a lighting fixture. For example, the DALI command converter device 100 may receive a DALI dim level command indicating a dim level for the light provided by the lighting fixture 202.

At step 504, the method includes providing, by the DALI command converter device, a first output signal to adjust a dim level of a first light emitted by a first light source to a first dim level. At step 504, the method includes providing, by the DALI command converter device, a second output signal to adjust a dim level of a second light emitted by a second light source to a second dim level that is different from the first dim level. The light provided by the lighting fixture is a combination of the first light and the second light. The first light emitted by the first LED light source may have a first CCT, and the second light emitted by the second LED light source may have a second CCT that is different from the first CCT.

The DALI command converter device generates the first output signal and the second output signal based on the DALI dim level command although the individual first and second dim level may not be the same dim level indicated by the DALI dim level command. The first output signal and the second output signal may be 0-to-10 volt dim control signals.

In some example embodiments, the DALI command converter device generates the first output signal based on a first dimming curve and generates the second output signal based on a second dimming curve. For example, the first dimming curve may be different from the second dimming curve.

In some example embodiments, the method 500 includes generating, by a first relay, a first switched power from a line power, and generating, by a second relay, a second switched power from the line power. The first switched power may be provided to a first LED driver that provides power to the first LED light source, and the second switched power may be provided to a second LED driver that provides power to the second LED light source.

In some example embodiments, the DALI command converter device may itself be an LED lighting driver, where the first output signal provides a first power to the first LED light source, and the second output signal provides a second power to the second LED light source.

In some example embodiments, the method 500 includes changing the first dimming curve by a third dimming curve that is different from the first and second dimming curves. The method 500 may also include changing the second dimming curve by a fourth dimming curve that may be different from the first, second, and/or third dimming curves.

Although particular embodiments have been described herein in detail, the descriptions are by way of example. The features of the example embodiments described herein are representative and, in alternative embodiments, certain features, elements, and/or steps may be added or omitted. Additionally, modifications to aspects of the example embodiments described herein may be made by those skilled in the art without departing from the spirit and scope of the following claims, the scope of which are to be accorded the broadest interpretation so as to encompass modifications and equivalent structures.

What is claimed is:

1. A method of adjusting a correlated color temperature (CCT) of a light provided by a lighting fixture, the method comprising:

receiving, by a DALI command converter device, a DALI dim level command indicating a dim level for the light provided by the lighting fixture;

providing, by the DALI command converter device, a first output signal to adjust a dim level of a first light emitted by a first light emitting diode (LED) light source to a first dim level; and providing, by the DALI command converter device, a second output signal to adjust a dim level of a second light emitted by a second LED light source to a second dim level that is different from the first dim level, wherein the first output signal and the second output signal are 0-to-10 volt dim control signals, wherein the light provided by the lighting fixture is a combination of the first light and the second light, and wherein the DALI command converter device generates the first output signal and the second output signal based on the DALI dim level command.

2. The method of claim 1, wherein the DALI command converter device generates the first output signal based on a first dimming curve and wherein the DALI command converter device generates the second output signal based on a second dimming curve that is different from the first dimming curve.

3. The method of claim 2, further comprising replacing the first dimming curve by a third dimming curve.

4. The method of claim 1, wherein the first light emitted by the first LED light source has a first CCT and wherein the second light emitted by the second LED light source has a second CCT that is different from the first CCT.

5. The method of claim 1, wherein the first output signal and the second output signal are provided to an LED driver that provides a first power to the first LED light source based on the first output signal and that provides a second power to the second LED light source based on the second output signal.

6. The method of claim 1, wherein the first output signal is provided to a first LED driver that provides a first power to the first LED light source based on the first output signal and wherein the second output signal is provided to a second LED driver that provides a second power to the second LED light source based on the second output signal.

7. The method of claim 6, further comprising:
generating, by a first relay, a first switched power from a line power; and
generating, by a second relay, a second switched power from the line power, wherein the first switched power is provided to the first LED driver and wherein the second switched power is provided to the second LED driver.

8. The method of claim 1, wherein the DALI command converter device is an LED lighting driver, wherein the first output signal provides a first power to the first LED light source, and wherein the second output signal provides a second power to the second LED light source.

9. The method of claim 1, wherein the DALI command converter device generates the first output signal and the second output signal based on a mapping of a dim level indicated by the DALI dim level command and a desired CCT of the light provided by the lighting fixture.

10. A DALI command converter device, comprising:
a memory device to store first dimming curve data and second dimming curve data, wherein the first dimming curve data corresponds to a first dimming curve and wherein the second dimming curve data corresponds to a second dimming curve that is different from the first dimming curve; and
a controller to receive a DALI dim level command indicating a dim level and to generate a first output signal based on the DALI dim level command and based on the first dimming curve data stored in the memory device and to generate a second output signal based on the DALI dim level command and based on the second dimming curve data stored in the memory device, wherein the first output signal and the second output signal are dim level control signals that result in a correlated color temperature (CCT) of a light provided by a lighting fixture, the CCT of the light corresponding to the dim level and wherein the first output signal and the second output signal are 0-to-10 volt dim control signals.

11. The DALI command converter device of claim 10, wherein the first output signal and the second output signal result in the light provided by a lighting fixture having the dim level indicated by the DALI dim level command.

12. The DALI command converter device of claim 10, further comprising:
a first relay to provide a first switched power signal from an input power signal; and
a second relay to provide a second switched power signal from the input power signal, wherein the controller controls switching of the first relay and the second relay based on the DALI dim level command.

13. The DALI command converter device of claim 10, further comprising a DALI interface to receive DALI commands from a DALI controller.

14. A lighting fixture, comprising:
a first light emitting diode (LED) light source to emit a first light;
a second LED light source to emit a second light, wherein the first light and the second light combine to produce a combined light provided by the lighting fixture;
an LED driver that provides power to the first LED light source and to the second LED light source; and
a DALI command converter device coupled to the LED driver, the DALI command converter device comprising:
a memory device to store first dimming curve data and second dimming curve data corresponding to different dimming curves; and
a controller that receives a DALI dim level command indicating a dim level, generates a first output signal based on the DALI dim level command and based on the first dimming curve data stored in the memory device, and generates a second output signal based on the DALI dim level command and based on the second dimming curve data stored in the memory device, wherein the first output signal and the second output signal are dim level control signals provided to the LED driver and that result in a correlated color temperature (CCT) of the combined light, the CCT of the combined light corresponding to the dim level and wherein the first output signal and the second output signal are 0-to-10 volt dim control signals.

15. The lighting fixture of claim 14, wherein the first output signal and the second output signal result in the combined light having the dim level indicated by DALI dim level command.

16. The lighting fixture of claim 14, wherein the DALI command converter device further comprises:
a first relay to provide a first switched power signal from an input power signal; and
a second relay to provide a second switched power signal from the input power signal, wherein the controller controls switching of the first relay and the second relay based on the DALI dim level command.

17. The lighting fixture of claim 14, wherein the first light emitted by the first LED light source has a first CCT and wherein the second light emitted by the second LED light source has a second CCT that is different from the first CCT.

* * * * *